US010121301B1

(12) United States Patent
Ren et al.

(10) Patent No.: US 10,121,301 B1
(45) Date of Patent: Nov. 6, 2018

(54) WEB-BASED STRUCTURE ACCESS

(71) Applicant: Amazon Technologies, Inc., Seattle, WA (US)

(72) Inventors: Margaret Ren, Santa Clara, CA (US); Unyoung Kim, San Carlos, CA (US); Kristine Anne Hanson, Palo Alto, CA (US); Priti Marappan, Sunnyvale, CA (US); Jenish Shah, Santa Clara, CA (US); Rohit Shrivastava, Saratoga, CA (US); Tian Yu, San Jose, CA (US); Jing Zhu, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/628,237

(22) Filed: Jun. 20, 2017

(51) Int. Cl.
 *G07C 9/00* (2006.01)
 *G06F 17/30* (2006.01)

(52) U.S. Cl.
 CPC ... *G07C 9/00896* (2013.01); *G06F 17/30035* (2013.01); *G07C 9/00023* (2013.01); *G07C 9/00571* (2013.01); *G07C 2209/08* (2013.01)

(58) Field of Classification Search
 None
 See application file for complete search history.

(56) References Cited

U.S. PATENT DOCUMENTS

| | | | |
|---|---|---|---|
| 9,058,738 B1 * | 6/2015 | Scalisi | G08B 25/10 |
| 9,272,713 B1 * | 3/2016 | Dvoskin | B60W 40/08 |
| 9,396,599 B1 * | 7/2016 | Malhotra | G07C 9/00174 |
| 9,666,000 B1 | 5/2017 | Schoenfelder et al. | |
| 9,667,798 B2 | 5/2017 | Witzel | |

OTHER PUBLICATIONS

Office Action for U.S. Appl. No. 15/628,120, dated Feb. 9, 2018, Ren, "Text-Based Structure Access", 6 pages.

* cited by examiner

*Primary Examiner* — K Wong
(74) *Attorney, Agent, or Firm* — Lee & Hayes, PLLC

(57) ABSTRACT

A first user associated with a structure (e.g., a home, a building, etc.) may authorize a second user to access the structure when the first user is not present. The second user may request to access the structure via a website associated with a URL that was previously provided. The second user may be verified/authenticated based on an access code input via the web site, a proximity of a device to the structure, and/or times in which the second user is authorized to access the structure. The second user may indicate, via the website, a desire to lock/unlock a structure entrance (e.g., a door) to the structure that contains a smart lock. Upon receiving a selection to lock/unlock the structure entrance, a service provider sends an instruction to the smart lock, causing the structure entrance to become locked/unlocked, and allowing the second user to access or secure the structure.

20 Claims, 7 Drawing Sheets

WEB-BASED STRUCTURE ACCESS

BACKGROUND

Users may gain access to a structure (e.g., a residence, a workplace, etc.) in various manners, such as by unlocking a lock with a key, entering a known code using an electronic keypad, or unlocking a smart lock using an electronic device (e.g., a mobile telephone). In the smart lock context, a user typically needs to download an application to his/her mobile device and then use that application to lock/unlock the smart lock. However, a user may be unable to lock/unlock a smart lock in different scenarios. For instance, the user would be unable to lock/unlock the smart lock if the mobile device of the user is not capable of downloading/storing applications. Moreover, provided that the smart lock application did in fact reside on the mobile device, the user would be unable to access the application due to a poor cellular signal/connection or Wi-Fi connection (or a lack thereof). This would result in the user being unable to access and/or secure the structure.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
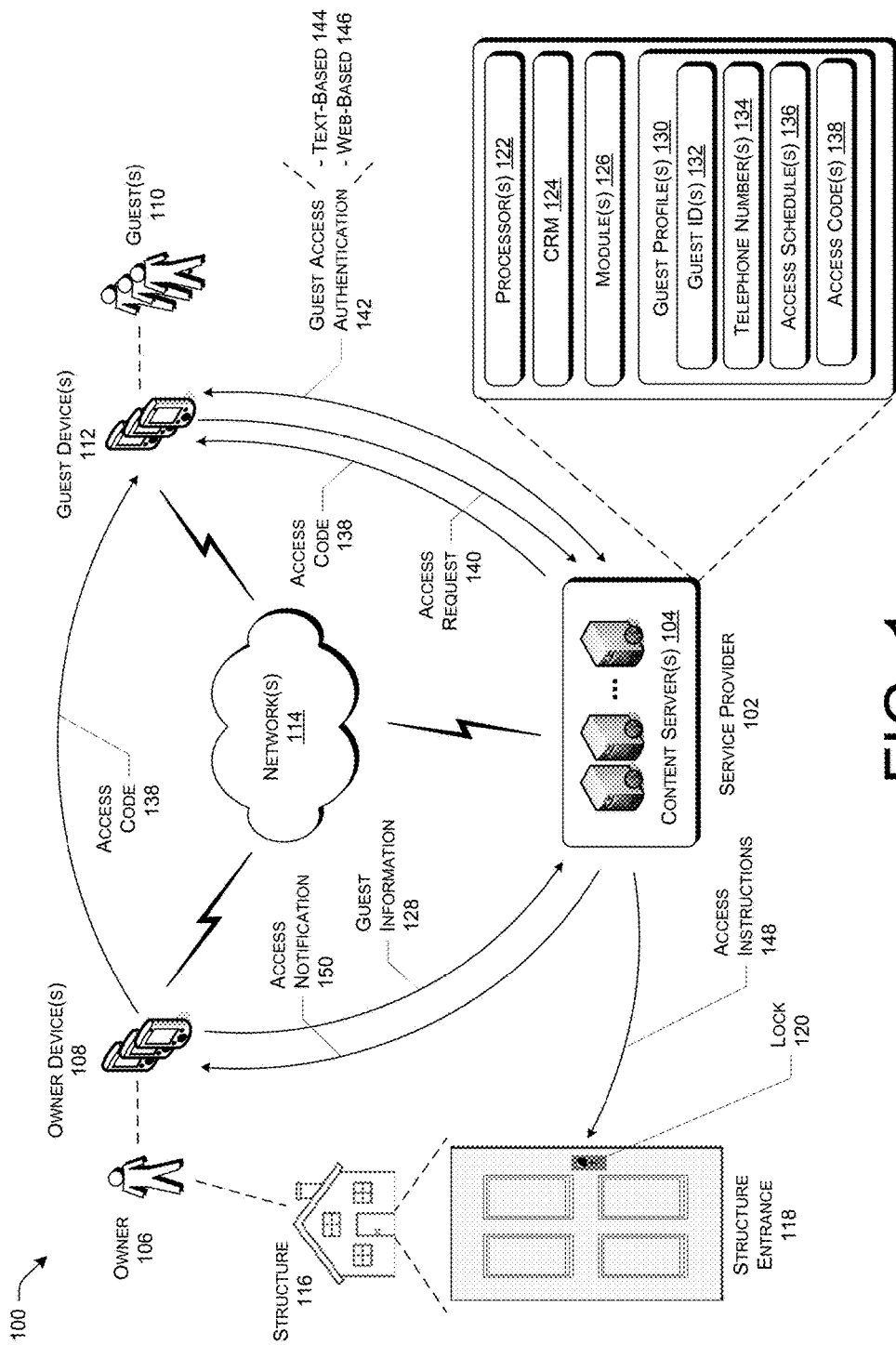
FIG. 1 illustrates an example system for locking/unlocking a smart lock using a text-based and/or a web-based authentication protocol.

Described herein are systems and/or processes for facilitating accessing and/or securing a structure by an authorized user via a structure entrance having a smart lock using a text-based and/or a web-based authentication protocol. A lock may be locked/unlocked exclusively using hardware or mechanical components, such as a physical lock and a physical key that is used to lock/unlock the lock. However, advances in technology allow doors, windows, etc., to be locked/unlocked digitally, such as by using a code (e.g., a combination of letters, numbers, symbols, etc.) that is entered via an electronic keypad. In addition, existing smart locks allow a user to lock/unlock the smart lock using their electronic device (e.g., a mobile telephone, a tablet computing device, etc.). The user may download an application associated with the smart lock to his/her electronic device, and then use that application to lock/unlock the smart lock. However, scenarios exist in which the user would be unable to lock/unlock the smart lock using the application, thereby preventing the user from accessing (e.g. unlocking the smart lock) or securing (e.g., locking the smart lock) a structure, such as a residence (e.g., a house, an apartment, a condominium, etc.), a workplace, a vehicle, a boat, and so on.

For instance, provided that a door to a house contains a smart lock, and that a user desires to lock/unlock the smart lock in order to access and/or secure the house. Although the user may not live at the house, the user (e.g., a guest, a family member, a friend, a service technician, etc.) may be authorized to gain access to the house by the owner/resident. If the user does not possess a smart phone that is capable of downloading and storing the application needed to lock/unlock the smart lock, the user would be unable to access the house, or would possibly be unable to secure the house if the house were unlocked. Moreover, even if the user possesses a mobile telephone that is capable of downloading an application that is used to lock/unlock the smart lock, a limited cellular connection and/or a limited Wi-Fi connection (or a lack of a connection) may prevent the user from accessing the application. Unless the owner locked/unlocked the smart lock for the user, the user would be unable to access and/or secure the house.

As a result, the systems and/or processes described therein may allow an owner associated with a structure (e.g., a residence, a workplace, etc.) to designate users/guests that are authorized to gain access to the structure using a smart lock. For a particular user/guest, the owner may provide to a service provider various types of user information, which may include an identity of the user/guest, a telephone number of the user/guest, and/or times/days in which the user/guest is authorized to access the structure. Upon receiving such information, the service provider may generate a guest/user profile for the user/guest and an access code that is to be used by the user/guest in order to access the structure. The service provider may provide the access code to the user/guest, such as via a text message, an e-mail message, etc.

Provided that the user/guest desires to access the structure by unlocking the door having the smart lock, a text-based authentication protocol may be used. In particular, the user/guest may send, to the service provider via his/her mobile device, a text message that includes the previously provided access code. The service provider may perform a two-factor authentication to ensure that the user/guest is authorized to access the structure at the time the access request is sent. For instance, the service provider may verify that the telephone number from which the text message is received matches the telephone number previously provided by the owner, and that the access code included within the text message matches the access code previously generated and provided by the service provider. If the telephone number or the access code do not match, then access to the structure will be denied. However, if the telephone number and the access code are verified, the service provider may confirm whether the time in which the text message was received is during a time in which the owner authorized access to the structure by the user/guest. If the user/guest is not authorized to access the structure at that time, the service provider may deny access to the user/guest. However, if the user/guest is authorized to access the structure at that time, the service provider may send an additional text to the user/guest inquiring whether the user/guest would like to access (unlock the door) or secure (lock the door) the structure (e.g., text "1" to unlock, text "2" to lock). Provided that the user/guest sends a text indicating a desire to lock or unlock the smart lock, the service provider may send an access instruction to the smart lock, thereby causing the door having the smart lock to be locked/unlocked. As a result, the user/guest may access the structure via the door, window, etc., where the smart lock is located. A similar process may be performed when the user/guest desires to lock the smart lock and secure the structure.

In other embodiments, the service provider may facilitating locking/unlocking of the smart lock using a web-based authentication protocol. When sending the access code to the user/guest, the service provider may also send a link or URL to a website that is to be used to facilitate locking/unlocking the smart lock. When the user/guest desires to access the structure via the smart lock, the user may select (e.g., "click on") the link/URL, which causes a website to be presented on a display of the mobile device of the user/guest. Via the website, the user/guest may input his/her access code. The service provider may verify whether the access code entered via the website matches the previously provided access code. If so, the service provider may perform further authentication to verify that the mobile device of the user/guest is in proximity to the smart lock of the structure. The service provider may determine a current geographic location of the mobile device (e.g., via GPS data, etc.) and verify that the current geographic location of the mobile device is within a threshold distance (e.g., 5 feet, 10 feet, etc.) from a known geographic location of the smart lock/structure. If not, the service provider may deny access to the structure. However, if the proximity of the mobile device is verified, the service provider may confirm that the user/guest has been authorized by the owner to access the structure at that time. Provided that the user/guest is authenticated and that the user/guest is authorized to access the structure, the service provider may cause the website to inquire whether the user/guest would like to lock/unlock the smart lock (e.g., press/select "lock" or "unlock"). Upon receiving a selection from the user/guest via the web site, the service provider may send an access instruction to the smart lock, thereby causing the smart lock to be locked/unlocked. The user/guest may then be allowed to access or secure the structure.

In some embodiments, regardless of whether a text-based or a web-based authentication protocol is used, the service provider may send a notification to the owner indicating that the smart lock has been, or will be, locked/unlocked, or indicating that an authorized or an unauthorized individual attempted to gain access to the structure. At any time prior to access, during access, or subsequent to access, the owner may revoke access rights to a user/guest.

FIG. 1 illustrates an example system 100 for facilitating the accessing or securing of a structure by an authorized user, such as by locking/unlocking a structure entrance having a smart lock. As shown in FIG. 1, the system 100 may include a service provider 102, a content server 104 associated with the service provider 102, an owner 106, one or more owner devices 108 associated with the owner 106, one or more guests 110, and one or more guest devices 112 associated with the guest(s) 110. The system 100 may also include a structure 116 associated with the owner 106, where the structure 116 may include at least one structure entrance 118 and a corresponding lock 120. The content server(s) 104, the owner device(s) 108, the guest device(s) 112, and/or the lock 120 may communicate via one or more networks 114. As shown herein, the content server(s) 104 may include one or more processors 122, computer-readable media 124 (abbreviated as "CRM" in FIG. 1), and one or more modules 126.

For the purpose of this discussion, the service provider 102 may be any entity, server(s), platform, etc., that offers, to customers, services relating to the security of structures 116, such as residences, workplaces, etc. That is, the service provider 102 may be a home secure access control system/service that allows customers to control the security/access of their home(s), particularly when the customer is not present at the home. Provided that the structure 116 includes at least one lock 120, such as a smart lock 120, associated with a structure entrance 118 (e.g., a door, window, etc.), the service provider 102 may facilitating the locking/unlocking of lock 120 by the owner 106 or other individuals that are authorized by the owner 106 to access the structure 116, where such authorized individuals are referred to herein as guests 110. The content server(s) 104 associated with the service provider 102 may include one or more servers, cloud-based resources, etc., that perform one or more authentication protocols that allow authorized users to unlock the structure entrance 118 using the lock 120, thereby providing access to the structure 116. The authentication protocol(s) may also allow users to lock the structure entrance 118 using the lock 120, thereby securing the structure 116, or at least securing the structure entrance 118 that includes the lock 120. As a result of verifying/authenticating a user, and verifying that the user is authorized to access the structure 116 at a particular time, the service provider 102 may cause the lock 120 to lock/unlock the structure entrance 118.

The owner 106 may be any individual or entity that is associated with a structure 116 and that is authorized to grant access to the structure 116 to other individuals/entities. For instance, the owner 106 may have an account/profile with the service provider 102, and may authorize the service provider 102 to lock/unlock a lock 120 of a structure entrance 118 of the structure 116 for other individuals/entities. Via the service provider 102, the owner 106 may grant access to other individuals/entities even when the owner 106 is not currently located at the structure 116. For instance, provided that the structure 116 is a house, apartment, condominium, etc., the owner 106 may be an individual that owns or resides at the structure 116. If the structure 116 is a workplace, the owner 106 may be an owner or employee of a company/employer that performs business operations (e.g., offers goods/services for sale) at the structure 116. The service provider 102 may serve as a remote system that allows individuals/entities other than the owner 106 to access the structure 116 when he/she is not present.

The guest(s) 110 may be any individual or entity in which the owner 106 has previously granted authorization to access the structure 116. For instance, the guest(s) 110 may include family members (e.g., a spouse, a significant other, children, grandparents, etc.), roommates, friends, houseguests, neighbors, co-workers, etc. of the owner 106. The guests 110 may also include any individual or entity that performs services associated with the structure 116, such as a nanny that cares for children of the owner 106, a housekeeper/housekeeping service that cleans the structure 116, a pet sitter/walker that cares for and/or walks a pet of the owner 106, and/or a contractor/service technician that performs services at the structure 116 (e.g., appliance maintenance/repair, cable/internet installation/repair, a security alarm service, etc.). That is, the guest(s) 110 may be any individual/entity in which the owner 106 would like to grant access to the structure 116 at a time at which the owner 106 is located elsewhere. For the purposes of this discussion, the owner 106 may also be referred to herein as "primary user" or "first user," and the guest(s) 110 may be referred to herein as "secondary user(s)" or "second user(s)."

The owner 106 and the guest(s) 110 may each be associated with one or more owner devices 108 and guest devices 112, respectively. The owner device(s) 108 may also be referred to herein as a "primary user device" or a "first user device," and the guest device(s) 112 may be referred to herein as a "secondary user device(s)" or a "second user device(s)," or the owner devices 108 and the guest devices 112 may be referred to as "user devices." For the purposes of this discussion, the owner device(s) 108 and the guest device(s) 112 may correspond to any electronic device including, but not limited to, mobile telephones, tablet computing devices, laptop computers, desktop computers, electronic book (eBook) reader devices, gaming consoles, and so on.

The network(s) 114 may facilitate communications and/or interactions between the content server(s) 104 of the service provider 102, the owner device(s) 108, the guest device(s) 112, and/or the lock 120. The network(s) 114 may facilitate such communications/interactions via any type of network, such as a public wide-area-network (WAN) (e.g., the Internet), which may utilize various different technologies including wired and wireless technologies. Moreover, the content servers 104 may contain any number of servers that are possibly arranged as a server farm. Other server architectures may also be used to implement the content servers 104.

As stated above, the structure 116 may be any building associated with the owner 106, including any building that the owner 106 would like to grant access to one or more guests 110. For instance, the structure 116 may be a residence, such as a house, a trailer, an apartment, a condominium, etc., or any other building (e.g., a shed, garage, etc.). The structure 116 may also be a workplace (e.g., a commercial building, or a suite within a building), a boat, a vehicle (e.g., a car, a motorhome, etc.), or any other item that the owner 106 authorizes guests 110 to access. The structure 116 may include one or more structure entrances 118 that serve as a mechanism for individuals to enter or exit the structure 116. For instance, a structure entrance 118 may include a door (e.g., a front/side/back door, a garage door, a car door, etc.) or a window. The structure entrance 118 may include one or more locks 120 that serve to secure the structure entrance 118. The lock 120 may be affixed to the structure entrance 118 (e.g., attached to or inserted into a door), or be in close proximity to the structure entrance 118. Although the lock 120 may be locked/unlocked using a physical key or via a code entered using an electronic keypad, for the purposes of this discussion, the lock 120 may be referred to herein as a smart lock 120.

A smart lock 120 may correspond to an electromechanical lock 120 that is designed to perform locking and/or unlocking operations on a structure entrance 118 (e.g., a door) when the smart lock 120 receives instructions from an authorized device using a wireless protocol and/or a cryptographic/virtual key. Like traditional locks, a smart lock 120 includes a lock and a key. However, unlike a physical key, the key may be a specialized virtual key (e.g., a key fob) that is configured to wireless perform an authentication protocol to automatically lock/unlock the structure entrance 118. The virtual key may be sent to the smart lock 120 by the content server(s) 104, the owner device(s) 108, and/or the guest device(s) 112 over one or more messaging protocols and/or networks, such as e-mail, Short Message Service (SMS), Bluetooth wireless technology (e.g., Bluetooth low energy (BLE)), Secure Sockets Layer (SSL), Wi-Fi, near-field communication (NFC), a cellular network (e.g., 3G, 4G, LTE, etc.), Zigbee, etc. Once the virtual key is received by the smart lock 120, hardware and/or software within the smart lock 120 cause the structure entrance 118 to be unlocked/locked. Certain smart locks 120 communicate with the content server(s) 104, the owner device(s) 108, and/or the guest device(s) 112 using a wireless network (Wi-Fi) maintained within the structure 116. However, in other embodiments, the smart lock 120 may include built-in Wi-Fi.

The smart lock 120 may have various components that allow for the locking/unlocking of the structure entrance 118. For instance, the smart lock 120 may include hardware and mechanical components similar to a standard lock. Such hardware/mechanical components may be made of metal, such as steel and/or tamper-proof alloys. The smart lock 120 may also have an electrical/communication component that receives instructions from the content server(s) 104 and causes the structure entrance 118 to lock/unlock. The smart lock 120 may further include a power assembly/unit, which may include one or more batteries and/or live current received via one or more electrical wires connected to the structure 116, and which may supply power/electricity to various components of the smart lock 120. Also included in the smart lock 120 may be a motor. When an access signal is received from the content server(s) 104, the motor may activate one or more pins, cylinders/tumblers, and/or slotted rotating discs, which may cause the bolt of the smart lock 120 to draw back from, or move forward into, the cavity associated with the strike plate. Movement of the bolt may cause the structure entrance 118 to lock/unlock.

In some embodiments, the content server(s) 104, the owner device(s) 108, the guest device(s) 112, and/or the lock 120 may include one or more processors 122, computer-readable media 124, which is indicated in FIG. 1 as "CRM", and one or more modules 126. The processor(s) 122 may execute the one or more modules 126 and/or processes to cause the content server(s) 104, the owner device(s) 108, the guest device(s) 112, and/or the lock 120 to perform a variety of functions, as set forth above and explained in further detail in the following disclosure. In some embodiments, the processor(s) 122 may include a central processing unit (CPU), a graphics processing unit (GPU), both CPU and GPU, or other processing units or components known in the art. Additionally, each of the processor(s) 122 may possess its own local memory, which also may store program modules, program data, and/or one or more operating systems.

The computer-readable media 124 may include volatile memory (such as RAM), non-volatile memory (such as ROM, flash memory, miniature hard drive, memory card, or the like), or some combination thereof. The computer-readable media 124 may be non-transitory computer-readable media 124. The computer-readable media 124 may include, or be associated with the one or more modules 126 that perform various operations associated with the content server(s) 104, the owner device(s) 108, and/or the guest device(s) 112. In some embodiments, the one or more modules 126 may include or be associated with computer-executable instructions that are stored by the computer-readable media 124 and that are executable by the processor(s) 122 to perform such operations. The content server(s) 104, the owner device(s) 108, and/or the guest device(s) 112 may also include additional components not listed above that may perform any function associated with the content server(s) 104, the owner device(s) 108, and/or the guest device(s) 112.

Provided that an owner 106 would like to grant/authorize access to a structure 116 to one or more guests 110, the owner 106 may send, to the content server(s) 104 and via his/her owner device 108, guest information 128. The guest information 128 (or user information) may be sent via an e-mail message, a text message, a telephone call, an application that resides on the owner device 108 and that is associated with the service provider 102, a website of the service provider 102, and so on. Based on the guest information 128, the service provider 102 may generate and maintain a guest profile 130 for each guest 110 that has been authorized access to the structure 116 by the owner 106. The guest profile 130 (or user profile) may store the guest information 128, which may include the identity of the guests 110 in which access to the structure 116 is to be authorized (i.e., guest IDs 132), one or more telephone numbers 134 of each of the guests 110, and/or an access schedule 136 for each of the guests 110. An access schedule 136 for a guest 110 may indicate an extent to which the guest 110 is authorized to access the structure 116, which may include times/days (or a combination thereof) in which the guest 110 is authorized to have access to the structure 116 (e.g., anytime, every Tuesday from 9-11 am, July 21-26, etc.), and may specify when access to the structure 116 expires. The service provider 102 may also generate an access code 138 (or short code) for each guest 110, where the access code 138 may be any number and combination of characters (e.g., letters, numbers, symbols, etc.) that the guest 110 is to subsequently use in order to gain access to the structure 116. Upon generation, and as shown in FIG. 1, the access code 138 for a guest 110 may be provided to that guest 110, such as via a text or SMS message. In some embodiments, the service provider 102/content server(s) 104 and/or the owner 106/owner device(s) 108 may provide the access code 138 to the guest device(s) 112 of the guest 110.

Provided that a particular guest 110 desires to gain access to the structure 116 of the owner 106, the guest 110 may arrive at the structure 116/structure entrance 118 and submit an access request 140. The access request 140 may take the form of a text message or information provided via a web site and may represent request to lock/unlock the structure entrance 118. Upon receiving the access request 140, the service provider 102 may perform a guest access authentication 142 with respect to the guest 110 and the received access request 140. The guest access authentication 142 may be a process that verifies the identity of the guest 110 based on the guest profile 130 for the guest 110, and that verifies that the guest 110 is authorized to access the structure 116 at the time the access request 140 is received pursuant to the access schedule 136 for that guest 110. The guest access authorization 142 may be text-based 144 and/or web-based 146. As will be described in additional detail herein, with respect to a text-based 144 guest access authentication 142, the access request 140 may constitute a text message sent by the guest device 112 of the guest 110 to the service provider 102, where the text message includes the access code 138 of the guest 110. The service provider 102 may authenticate the guest 110 based on the telephone number 134 in which the text message was sent, the access code 138 included in the text message, and the access schedule 136 of the guest 110. On the other hand, in a web-based 146 guest access authentication 142, the access request 140 may correspond to the guest 110 submitting the access code 138 via a website that is associated with a link/URL that was previously provided by the service provider 102. In the web-based 146 scenario, the guest 110 may be authenticated based on the access code 138 and a proximity between the current location of the guest device 112 that was used to submit the access code 138 and a known location of the structure entrance 118/lock 120.

Assuming that the guest access authentication 142 process verifies and/or authenticates the guest 110, the service provider 102 may inquire, via a text message (in the text-based 144 example) or the website (in the web-based 146 example), whether the guest 110 would like to lock or unlock the structure entrance 118. The guest 110 may provide a response via a text message or the website and, based on the response (e.g., lock or unlock the structure entrance 118), the service provider 102 may send one or more access instructions 148 to the lock 120. The access instruction(s) 148 may instruct the lock 120 to either lock or unlock the structure entrance 118, which may allow the guest 110 to access the structure 116 via the structure entrance 118 or secure the structure 116 by locking the structure entrance 118. Instead of being sent directly to the lock 120, the access instructions 148 may be communicated or transmitted to a separate device that then communicates/transmits instructions (e.g., the access instructions 148 or different/modified instructions) to the lock 120. This device may be a server or a hub that is located at the structure 116 or that is located remotely from the structure 116. In some embodiments, and possibly based on a preference/setting set forth by the owner 106, either prior to or after the access instructions 148 are sent, the service provider 102 may send an access notification 150 to the owner 106, where the access notification 150 may indicate that the guest 110 is attempting to access, or has accessed, the structure 116.

In certain embodiments, the system 100 may also include one or more cameras (e.g., still image cameras, video cameras, etc.) that are located at or near the structure entrance 118 of the structure 116. The structure entrance 118 may be within a field of view of the camera(s) such that images and/or video captured by the camera(s) may depict the guest 110 that is attempting to access or secure the structure 116. In some embodiments, the camera(s) may capture images/video continuously or may capture images/video in response to a motion sensor detecting movement within its field of view. However, in other embodiments, the camera(s) may begin capturing images/video when the access request 140 is submitted by the guest 110, when the access instructions 148 are sent by the content server(s) 104, or when the structure entrance 118 is unlocked/locked. If the camera(s) capture video data, once the camera(s) begin capturing video, the camera(s) may capture video for a particular period of time (e.g., 30 seconds). As a result, the images/video may depict the guest 110 that is entering/exiting the structure 116 via the structure entrance 118. The images/video may be maintained in the CRM 124 of the content server(s) 104, and may be transmitted to the owner 106 (e.g., via a text message, an e-mail message, a mobile application, etc.). That way, the owner 106 may view individuals (e.g., guests 110) that are accessing and/or securing, or are attempting to access/secure, the structure 116.

Figure 2:
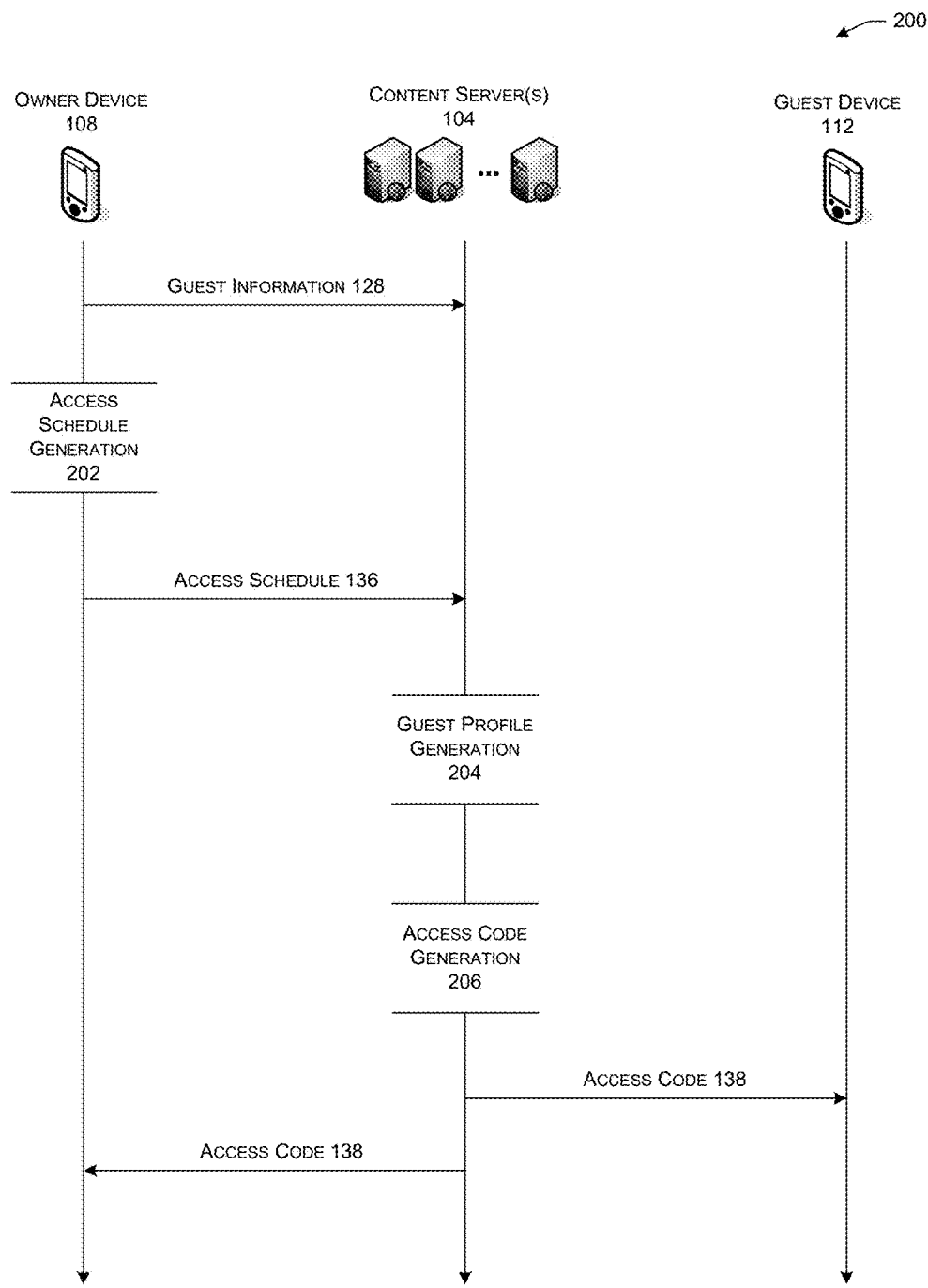
FIG. 2 illustrates an example diagram for generating a guest profile and an access code to be used to facilitate accessing or securing a structure by an authorized user.

FIG. 2 illustrates an example diagram 200 for generating a guest profile and an access code to be used to lock/unlock a structure entrance of a structure having a smart lock. As illustrated, the diagram 200 includes the content server(s) 104, an owner device 108 associated with an owner 106, and a guest device 112 associated with a guest 110. For the purposes of FIG. 2, the owner 106 may be associated with a structure 116 (e.g., a residence, a workplace, etc.) and the guest 110 may be an individual/entity that the owner 106 would like to grant/authorize access to the structure 116. For instance, the guest 110 may be a family member, friend, neighbor, etc., of the owner 106 or an individual/entity that is to perform services in association with the structure 116 (e.g., a contractor, a service technician, a nanny, a pet caregiver, etc.).

In order to authorize the guest 110 to have access to the structure 116, the owner 106, via the owner device 108, may send guest information 128 to the service provider 102. The guest information 128 may be provided via a text message, an e-mail message, an application that resides on the owner device 108 and that is associated with the service provider 102, a website associated with the service provider 102, and so on. Moreover, the guest information 128 may include various types of information about the guest 110. For instance, the guest information 128 may possibly include an identity (i.e., guest ID 132) of the guest 110 (e.g., a name, an identifier, etc.), a telephone number 134 of a mobile telephone of the guest 110, and any other information associated with the guest 110.

The guest information 128 may also include information regarding when the guest 110 is authorized to have access to the structure 116. For instance, the owner 106 may specify particular time(s) (e.g., 9-11 am) and/or days (e.g., Tuesdays) in which access is authorized, a duration of the authorized access (e.g., two hours, all day, two weeks, etc.), whether the authorized access is recurring (e.g., daily, weekly, monthly, etc.), whether the authorized access expires (e.g., two weeks, two months, etc.), and so on. The extent to which the guest 110 is authorized access to the structure 116 may be referred to herein as the access schedule 136, and the access schedule 136 may be generated by the owner 106 (i.e., access schedule generation 202) and provided to the service provider 102. In other embodiments, the owner 106 may provide such information to the service provider 102 and the service provider 102 may then generate the access schedule 136 for the guest 110 based on the access information provided by the owner 106.

As discussed above, the access schedule 136 for a particular guest 110 may indicate an extent to which access to the structure 116 is authorized. In particular, the access schedule 136 may specify times at which the guest 110 is authorized to access the structure 116 (via the structure entrance 118 having the lock 120). For example, the guest 110 may always have access, regardless of the time of day or the day of the week. Access to the structure 116 by the guest 110 may also be for a particular time (e.g., 10 am), time period (e.g. 9-11 am), or day (e.g., Tuesdays), or a combination thereof (e.g., Tuesdays from 9-11 am). Access during these times/days may also be recurring (e.g., every Tuesday between 9-11 am, monthly, etc.). Access to the structure 116 by the guest 110 may also be a one-time access, and the guest 110 may not have access to the structure 116 after that time unless the owner 106 subsequently authorizes further access by the guest 110.

The access schedule 136 may also indicate the length of time in which access is authorized. Access to the structure 116 may be authorized for an indefinite period of time (no end time/date), or for a particular duration of time. For instance, the guest 110 may have access to the structure 116 until a certain date (e.g., access until July 24$^{th}$) or for a certain time period (June 1$^{st}$ to July 31$^{st}$). In some embodiments, if the owner 106 does not specify conditions in which the guest 110 is authorized to access the structure 116, the service provider 102 may infer that the guest 110 is authorized to access the structure 116 at any time for an indefinite amount of time (no end date/time).

Upon receiving the guest information 128 and the access schedule 136 from the owner 106 (or after generating the access schedule 136 based on information provided by the owner 106), the service provider 102 may generate a guest profile 130 for the guest 110 (i.e., guest profile generation 204). The guest profiles 130 may be maintained by the content server(s) 104 and then accessed when a guest 110 requests to access a structure 116. In addition to generating the guest profile 130 for a guest 110, the service provider 102 may generate an access code 138 for the guest 110 (i.e., access code generation 206). The access code 138 for a particular guest 110 may be any number or combination of letters, numbers, symbols, etc. and may be maintained in the guest profile 130 of the guest 110. In some embodiments, the access code 138 may be a short code or short number (collectively referred to herein as "short code(s)" or "dedicated short code(s)"), which may correspond to short digit sequences (e.g., a six-digit alphanumeric code) that are typically shorter than telephone numbers, and a short code may serve to replace a telephone number. Short codes may be used to address messages in the Multimedia Messaging system (MMS) and SMS of mobile network operators. Regardless of the type of access code 138, each guest 110 may be assigned a different and/or unique access code 138.

The service provider 102 may send the access code 138 associated with the guest 110 to a corresponding guest device 112, such as via a text message, an e-mail message, a mobile application, a website, and so on. Provided that the access code 138 is sent via a text message, the text message sent by the service provider 102 may include the access code 138, and the text message may be sent via a dedicated short code associated with the service provider 102. For the purposes of this discussion, each guest 110 may send text messages to the same short code of the service provider 102 for the purpose of submitting an access request 140, and reply text messages from the service provider 102 will be received from this short code. The guest 110 may maintain his/her access code 138 when subsequently requesting to access the structure 116 associated with the owner 106. In some embodiments, the text message sent by the service provider 102 may indicate that the owner 106 has authorized the guest 110 to access the structure 116, and that the access code 138 will be needed for subsequent access. For instance, the text message could state, "Jim has granted you access to his home, and access code 398567 is needed for access." In order for the guest 110 to subsequently access the structure 116 via the structure entrance 118 (and cause the structure entrance 118 to be locked/unlocked using the lock 120), the guest 110 may need to provide the previously provided access code 138. As discussed in additional detail with respect to FIG. 4, for the web-based 146 guest access authentication 142, the text message may include both the access code 138 for the guest 110 and a link/URL to a web site that will be used to submit an access request 140.

In some embodiments, instead of, or in addition to, the service provider 102/content server(s) 104 sending the access code 138 to the guest device 112 of the guest 110, the service provider 102/content server(s) 104 may transmit the access code 138 assigned to the guest 110 to the owner 106. The owner 106, via his/her owner device 108, may then send the access code 138 to the guest device 112 of the guest 110 via a text message, an e-mail message, etc. For instance, a text message sent by the owner 106 to the guest 110 may state, "Hi John, I have granted you access to my home, and you can use access code 398567 for access." In other embodiments, the service provider 102/content server(s) 104 may send the access code 138 assigned to the guest 110 to both the owner 106 and the guest 110.

Figure 3:
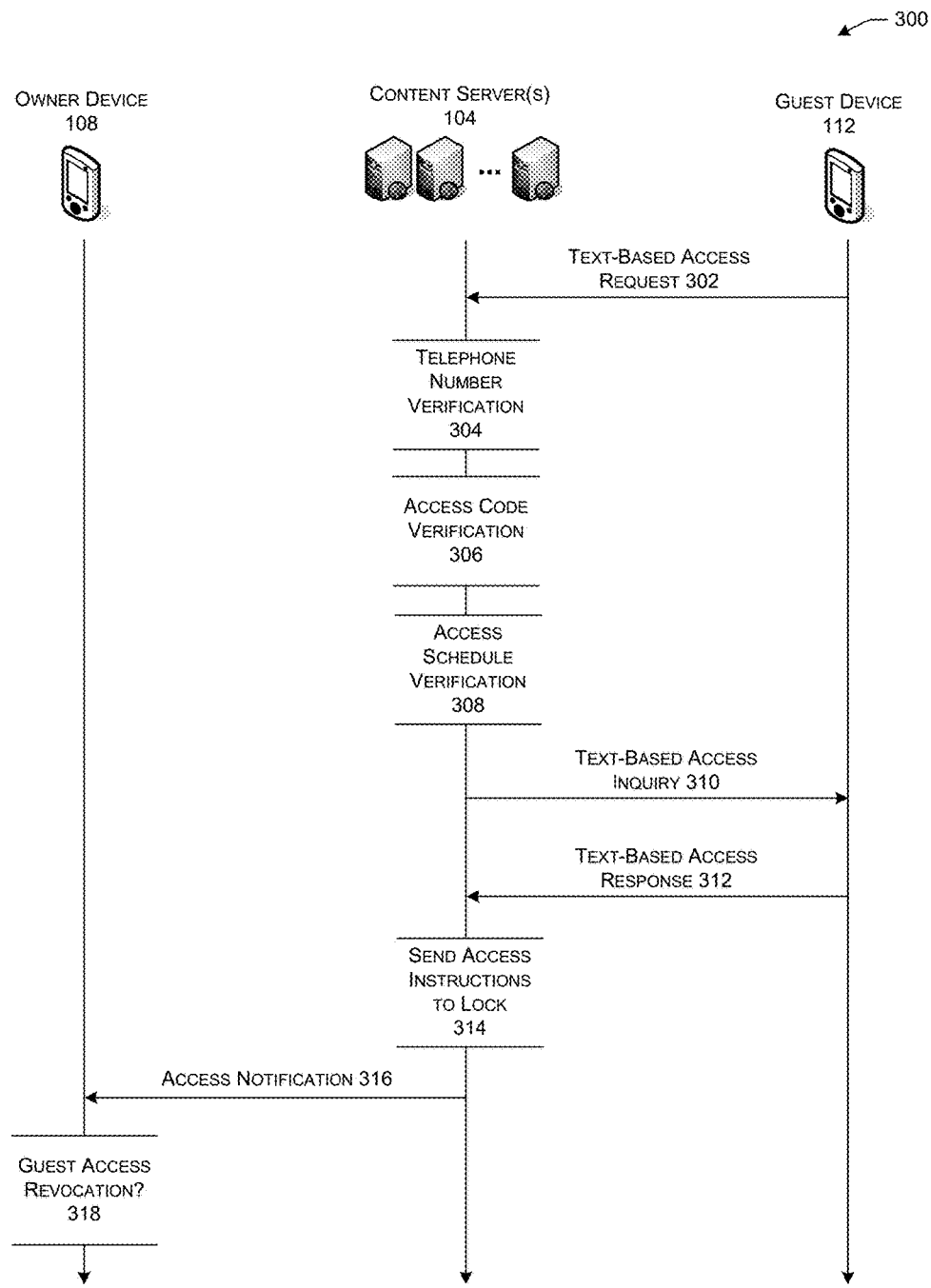
FIG. 3 illustrates an example diagram for a text-based process/protocol to facilitate accessing or securing a structure by an authorized user via a structure entrance having a smart lock.

FIG. 3 illustrates an example diagram 300 for facilitating access to a structure by a guest based on a text-based authentication protocol. As discussed above with respect to FIG. 2, an owner 106 associated with a structure 116 (e.g., a house) may authorize a guest 110 to access the structure 116. More particularly, the owner 106 may authorize the guest 110 to access the structure 116 via a structure entrance 118 that includes a lock 120, such as a smart lock 120. The service provider 102 may generate an access code 138 (e.g., a short code) that may be used by the guest 110 to access the structure 116. Upon the guest 110 submitting an access request 140 to the service provider 102 to access the structure 116, the service provider 102 may perform a guest access authentication 142 protocol to verify/authenticate the guest 110. The guest access authentication 142 may be text-based 144 or web-based 146. The diagram 300 illustrated in FIG. 3 relates to the text-based 144 guest access authentication 142. As shown, the diagram 300 includes the content server(s) 104 associated with the service provider 102, an owner device 108 associated with an owner 106, and a guest device 112 associated with a guest 110. The owner 106 may be associated with a structure 116 that is to be accessed by the guest 110, with authorization by the owner 106.

When the guest 110 would like to access the structure 116, such as when the guest 110 arrives at the location of the structure (e.g., a house), the guest 110 may submit an access request 140 via his/her guest device 112 (e.g., a mobile telephone). In particular, the guest 110 may submit/send a text-based access request 302 to the service provider 102, where the text-based access request 302 may be a text message sent to a telephone number or short code associated with the service provider 102. In order to gain access to the structure 116, the guest 110 may include, within the text message, the access code 138 that is associated with the guest 110 and that was previously provided to the guest 110 by the service provider 102. Since the owner 106 previously identified the telephone number 134 of the guest 110 in the guest information 128 provided to the service provider 102, the guest 110 should send the text message from the mobile telephone that is associated with that telephone number 134.

Upon receiving the text-based access request 302 from the guest 110, the service provider 102 may perform a search with respect to the guest profiles 130 generated by the service provider 102 and maintained in the content server(s) 104. In particular, the service provider 102 may search the guest profiles 130 using the telephone number 134 in which the text message was received and/or the access code 138 that was included in the text message. As a result of the search, the service provider 102 may identify the guest profile 130 associated with the guest 110 that submitted the text-based access request 302. The service provider 102 may then authenticate the guest 110 in order to verify that the text-based access request 302 was sent by an individual that is authorized by the owner 106 to access the structure 116, and to prevent allowing unauthorized individuals to access the structure 116. The service provider 102 may perform a two-factor authentication with respect to the text-based access request 302. The service provider 102 may perform a telephone number verification 304 to confirm that the text message was received from the telephone number 134 included in the guest profile 130 of the guest 110. That is, the service provider 102 may confirm that the text message was received from the telephone number 134 of the guest 110 that was previously identified by the owner 106. If the telephone number 134 associated with the text message does not match the telephone number 134 included in the guest profile 130 of the guest 110, the service provider 102 may deny access to the structure 116. In this scenario, the service provider 102 may send a return text message to the telephone number 134 indicating that access to the structure 116 has been denied.

If the telephone number verification 304 verifies that the text-based access request 302 (i.e., the text message) was received from the telephone number 134 identified in the guest profile 130 of the guest 110, the service provider 102 may perform an access code verification 306. The access code verification 306 may verify that the access code 138 included in the text message received from the telephone number 134 matches the access code 138 included in the guest profile 130 of the guest 110. If so, and provided that the telephone number verification 304 confirms that the text message was received by the telephone number 134 of the guest 110, the service provider 102 may verify that the text-based access request 302 was received from a guest 110 that is authorized to access the structure 116. However, if the access code 138 included in the text message is not the same as the access code 138 included in the guest profile 130 of the guest 110, then the service provider 102 may deny access to the structure 116. The service provider 102 may send a text message to the telephone number 134 that submitted the text-based access request 302 indicating that access to the structure 116 has been denied.

Provided that the guest 110 is authorized to access the structure 116, the service provider 102 may perform an access schedule verification 308. In various embodiments, the access schedule verification 308 may determine whether, at the time the text-based access request 302 was submitted/received, the guest 110 is authorized to access the structure 116. As discussed herein, the owner 106 may specify times at which different guests 110 are authorized to access the structure 116. For instance, the owner 106 may specify that a guest 110 may access the structure 116 anytime, on certain days, at certain times, on certain days at certain times, and so on. The guest profile 130 of the guest 110 may include an access schedule 136 that indicates times/days (or a combination thereof) in which access to the structure 116 by the guest 110 is authorized. As a result, upon receiving the text-based access request 302, the service provider 102 may verify that the guest 110 is in fact authorized or scheduled to access the structure 116 at that time. If the guest 110 is not authorized to access the structure 116 at that time, the service provider 102 may deny access to the structure 116 and send a corresponding text message to the guest device 112 of the guest 110.

Provided that the telephone number verification 304, the access code verification 306, and/or the access schedule verification 308 is confirmed/verified, the service provider 102 may request what action the guest 110 would like to take/perform. In various embodiments, the service provider 102 may perform some, all, or none of the foregoing verifications, and some, all, or none of these verifications need to be satisfied in order to authorize access to the guest 110. In some instances, the guest 110 may request that the structure entrance 118 be unlocked so that the guest 110 is able to access the structure 116. On the other hand, if the guest 110 has already access the structure 116 and is leaving, the guest 110 may desire to lock the structure entrance 118 so that the structure 116 is secure. Accordingly, the process illustrated in FIG. 3 may apply to the unlocking of the structure entrance 118 and access to the structure 116, as well as to the locking of the structure entrance 118 and securing the structure 116.

To determine which action the guest 110 desires to take, the service provider 102 may send, to the guest device 112, a text-based access inquiry 310. The text-based access inquiry 310 may be a text message that provides options regarding locking/unlocking the structure entrance 118. For instance, the text message may instruct the guest 110 to send a first text message if the guest 110 would like to unlock the structure entrance 118 and access the structure 116 (e.g., "text '1' or 'unlock' to unlock/access"), or send a second text message if the guest 110 would like to lock the structure entrance 118 and secure the structure 116 (e.g., "text '2' or 'lock' to lock/secure"). The particular text message that is to be sent by the guest 110 to lock/unlock the structure entrance 118 may be static and remain the same (e.g., "1" to unlock, "2" to lock), or may dynamically change over time. To prevent spoofing, the service provider 102 may send the text message by initiating a new conversation, as opposed to directly replying to the text message sent by the guest 110. However, the text message sent by the service provider 102 may appear in the conversation history on the guest device 112 of the guest 110.

After sending the text-based access inquiry 310 to the guest device 112 of the guest 110, the service provider 102 may determine if the guest 110 responds within a threshold amount of time (e.g., 10 seconds, 1 minute, 5 minutes, etc.). If the guest 110 does not send a text message to the service provider 102 within that specified or predetermined amount of time, access to the structure 116 may be denied and the guest 110 may have to repeat the process set forth above in order to access/secure the structure 116. The service provider 102 may send a text to the guest device 112 indicating that the text-based access request 302 timed out and that the guest 110 will need to again request access to the structure 116 in order to gain access.

In some embodiments, the service provider 102 may receive, from the guest device 112 of the guest 110, a text-based access response 312. The text-based access response 312 may be responsive to the text-based access inquiry 310 and may take the form of a text message from the guest device 112 of the guest 110. Such a text message may indicate whether the guest 110 desires to access/unlock or secure/lock the structure 116. For instance, the text message may include a "1" or the term "unlock" to unlock the structure entrance 118 so that the guest 110 may access the structure 116. The text message may instead include a "2" or the term "lock" to lock the structure entrance 118 and therefore secure the structure 116. Provided that the text-based access response 312 is received from the guest device 112 within the threshold amount of time, the service provider 102 may determine that the guest 110 would like to access or secure the structure 116 and cause the structure entrance 118 to be unlocked or locked, respectively.

In order to cause the structure entrance 118 to be unlocked/locked, the service provider 102/content server(s) 104 may send one or more instructions to a server, device, hub, etc., that transmits further instructions to the smart lock 120 using any type of communication protocol/network. The access instructions 148 may also be sent directly to the smart lock 120 associated with the structure entrance 118 (i.e., send access instructions to lock 314). Provided that the access instructions 148 are transmitted directly to the lock 120, the access instructions 148 may be sent to hardware and/or software components of the smart lock 120 using any type of communication protocol/network (e.g., Zigbee, Bluetooth, etc.). In some embodiments, the access instructions 148 may include one or more digital keys that cause the smart lock 120 to lock/unlock. The access instructions 148 may cause the smart lock 120 to lock/unlock the structure entrance 118, thereby allowing the guest 110 to access the structure 116 via the structure entrance 118 or secure the structure entrance 118. As a result, the guest 110 may access/secure the structure 116 via an exchange of one or more text messages, and without having to use an application residing on a mobile telephone/electronic device.

In some instances, and possibly based on preferences/settings specified by the owner 106, the service provider 102 may send one or more access notifications 316 to the owner device 108 of the owner 106. An access notification 316 may take the form of an e-mail message, a text message, etc., and may notify the owner 106 that an authorized guest 110 accessed/secured the structure 116 or that an authorized guest 110 attempted to access the structure 116 at a time at which the guest 110 did not have authority to access the structure 116. Such an access notification 316 may be sent at the time the text-based access request 302 is received, during access by the guest 110, or after the guest 110 has accessed/secured the structure 116. The access notification 316 may also notify the owner 106 that an unauthorized individual attempted to access the structure 116, or that an unauthorized individual did in fact access the structure 116. In various embodiments, an access notification 316 may be sent to the owner device 108 of the owner 106 each time the structure entrance 118 is locked or unlocked using the smart lock 120.

The owner 106 may revoke or modify an authorization to access the structure 116 with respect to a guest 110 at any time (i.e., guest access revocation 318). In some embodiments, the owner 106 may elect to revoke or modify the extent to which a guest 110 is authorized to access the structure 116 after an access request 140 is received. For instance, the service provider 102 may receive an access request 140 from a guest 110, and then send an access notification 316 to the owner device 108 indicating that the guest 110 is attempting to access the structure 116. At that time, the owner 106 may elect to modify/revoke access to the structure 116 by the guest 110. In response the service provider 102 may indicate to the guest 110, such as via a text message or via a web site, that access to the structure 116 has been denied and/or revoked.

It is contemplated that, after an authorized guest 110 accesses the structure 116, he/she may forget to lock the structure entrance 118 to secure the structure 116. That is, the guest 110 may not perform the process illustrated in FIG. 3 in order to lock the structure entrance 118. In this scenario, the service provider 102 may cause the structure entrance 118 to be locked in order to secure the structure 116. For instance, the service provider 102 may send a notification to the owner device 108 of the owner 106 informing the owner 106 that the structure entrance 118 has not been locked/relocked after being unlocked. In response, the owner 106 may send an instruction to the service provider 102 requesting that the structure entrance 118 be locked. Alternatively, the owner 106 may cause the structure entrance 118 to be locked using an application that resides on the owner device 108 or via a website. In other embodiments, the service provider 102 and/or the owner 106 may determine that the structure entrance 118 is to be locked within a threshold amount of time (e.g., 10 seconds, 30 seconds, 1 minute, 5 minutes, etc.) after being unlocked. In this scenario, the structure entrance 118 may be automatically locked without the owner 106 having to provide any instructions.

As stated elsewhere herein, in order to lock/unlock existing smart locks, a user would need to access and interact with an application that is downloaded to, and that resides on, a mobile device, such as a smartphone. Non-smartphone users would be unable to lock/unlock existing smart locks using their mobile device. If a user does not have a physical key to lock/unlock the smart lock, or if the user does not know a code to input into a keypad (if one is even present), the user would be unable to access and/or secure the house, building, etc., associated with the smart lock. Accordingly, a technological problem exists with respect to non-smartphone users accessing/securing a house/building that includes a smart lock. The process illustrated in FIG. 3 and described herein sets forth a technological solution to this technological problem. Since the systems and process described herein allow a user to unlock/lock a door to a house/building that contains a smart lock 120 using one or more text messages, a user would not need a smartphone to access/secure the house/building. A non-sophisticated mobile device that does not have the ability to connect to the Internet or download applications, but possesses the ability to send/receive text messages, can be used to access/secure a house/building having a smart lock 120. This technological solution applies to a multitude of individuals that do not possess a smartphone for a variety of reasons. Such users may include those that cannot, or will not, pay the costs of a smartphone, those that are unwilling or unable to pay the costs for a data plan needed for using a smartphone, those that are unfamiliar or uncomfortable with the always changing technology associated with smartphones, those that are traveling (possibly abroad) and who do not have a data plan during such travels, and so on.

Figure 4:
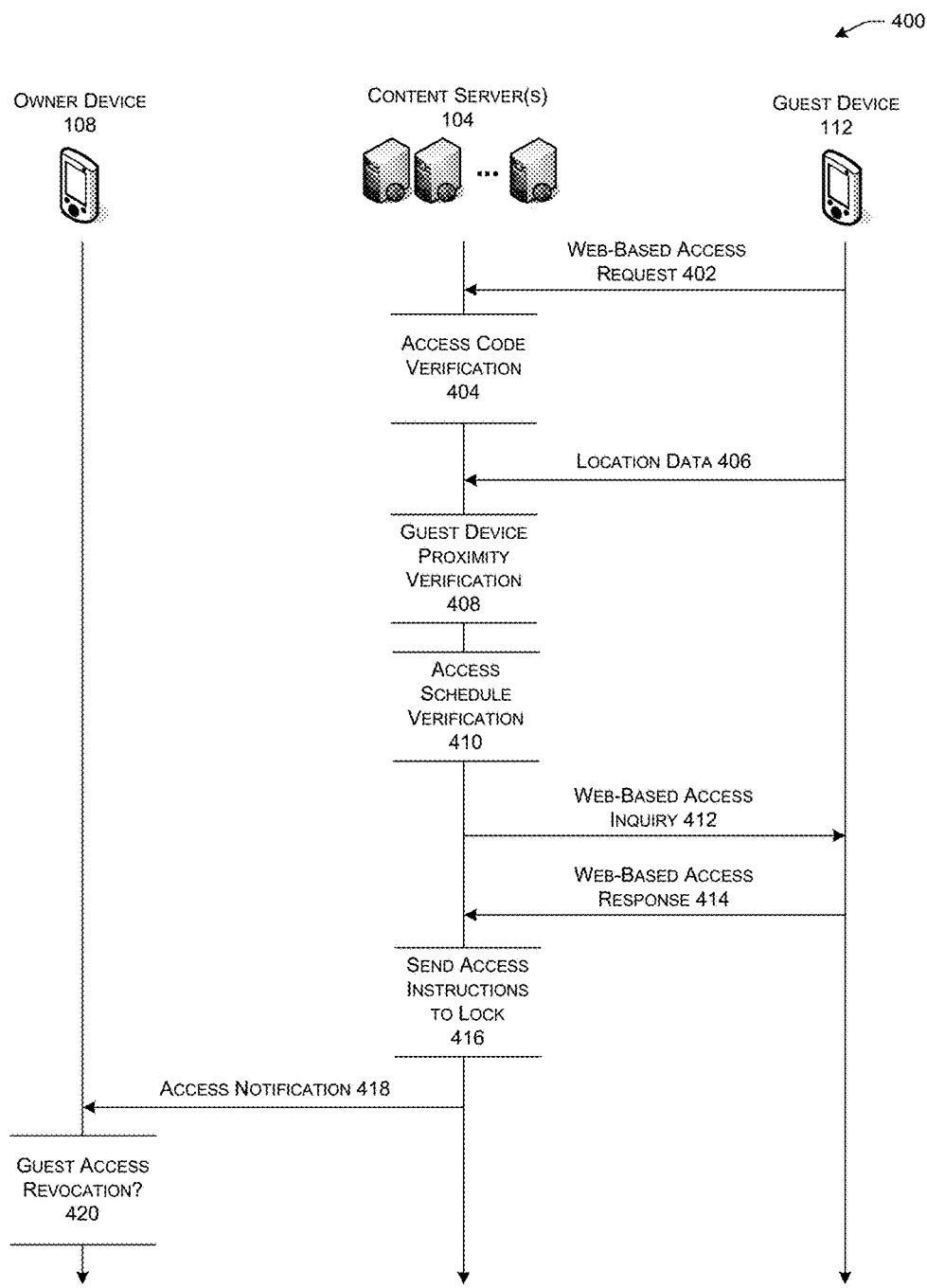
FIG. 4 illustrates an example diagram for a web-based process/protocol to facilitate accessing or securing a structure by an authorized user via a structure entrance having a smart lock.

FIG. 4 illustrates an example diagram 400 for facilitating access to a structure by a guest based on a web-based authentication protocol. This protocol may correspond to the web-based 146 guest authentication protocol 142 illustrated in FIG. 1. As illustrated, the diagram 400 may include the content server(s) 104 associated with the service provider 102, an owner device 108 associated with an owner 106, and a guest device 112 associated with a guest 110 that desires to access a structure 116 (e.g., a house) associated with the owner 106. As discussed herein, upon generating a guest profile 130 for the guest 110, the service provider 102 may generate an access code 138 for the guest 110 and send the access code 138 to the guest device 112 of the guest 110 via a text message, an e-mail message, etc. Along with the access code 138, the service provider 102 may include a link to, or a URL for, a website that is to be subsequently used by the guest 110 to access/secure the structure 116.

In some embodiments, upon the owner 106 authorizing a guest 110 to have access to a structure 116, the service provider 102 may send a text message to the guest device 112 of the guest 110. The text message may indicate that the owner 106 has elected to grant access to the structure 116, and that the guest 110 can select the link/URL and enter the access code 138 when the guest 110 is schedule to access the structure 116 (e.g., "Bob Jones has shared access to his home. When you are scheduled to visit, click on the link and enter your unique identification code [abc123] to gain access"). The guest 110 may also receive a text message from the telephone number of the owner 106, which may state that the owner 106 has authorized access to the structure 116 and to expect a text message with additional information from the service provider 102 (e.g., "I just shared access with you. Expect an additional text with further information, and your unique identification code is [abc123]").

When the guest 110 would like to access (or secure) the structure 116 by unlocking/locking a structure entrance 118 of the structure 116, the guest 110 may submit a web-based access request 402 via his/her guest device 112. In particular, via his/her guest device 112, the guest 110 may select the link/URL that was previously provided by the service provider 102, which may cause a website associated with the service provider 102 to be presented on a display of the guest device 112. Via the web site, the guest 110 may input/enter his/her access code 138 and submit the web-based access request 402, such as by actuating a selectable option (e.g., a button) within the web site. The service provider 102 may then receive the web-based access request 402, which includes the access code 138 of the guest 110.

In order to verify that the web-based access request 402 is from an individual that is authorized by the owner 106 to access the structure 116, the service provider 102 may perform an access code verification 404, which may be similar to the access code verification 306 described above with respect to FIG. 3. In some embodiments, the link/URL provided to the guests 110 may be unique for each guest 110, such that service provider 102 may determine the identity of the guest 110 when the guest 110 submits the web-based access request 402 via the web site associated with the unique link/URL. In some embodiments, the link/URL may be changed over time for security purposes. If the link/URL is unique to the guest 110, the service provider 102 may determine the identity of the guest 110 prior to performing the access code verification 404. In other embodiments, however, the link/URL provided to the guest 110 may be generic such that the same link/URL is provided to each guest 110. In that scenario, the service provider 102 may determine the identity of the guest 110 as a result of the access code verification 404, or as a result of the guest 110 providing login information associated with an account/profile of the guest 110 with respect to the service provider 102. Regardless of whether the link/URL is generic or unique, via the access code verification 404, the service provider 102 may determine whether the access code 138 submitted via the website is the same as the access code 138 included in the guest profile 130 of the guest 110. If not, the service provider 102 may deny access to the structure 116 and indicate, via the website, that the guest 110 is not authorized to access the structure 116. Provided that the access code 138 submitted with the web-based access request 402 matches the access code 138 included in the guest profile 130 of the guest 110, the service provider 102 may determine that the guest 110 has been authorized by the owner 106 to access the structure 116.

To further verify/confirm authorization to access the structure 116, the service provider 102 may determine, receive, and/or obtain location data 406 associated with the guest device 112 of the guest 110. More particularly, the service provider 102 may determine a current geographic location of the guest device 112 (e.g., GPS coordinates) that submitted the web-based access request 402. The location data 406 may be determined based on an application that resides on the guest device 112 and that is associated with the service provider 102, and/or a location sensor associated with the guest device 112. Although the location of the guest device 112 may be determined in any manner, the location may be determined using GPS technology, triangulation, multilateration of radio signals between cell towers of the network of the guest device 112, and so on. In various embodiments, before obtaining location data 406 associated with the guest device 112, the service provider 102 may request, via the web site, permission from the guest 110 to access his/her location. The guest 110 may select an option to allow the service provide 102 to access the current location of the guest device 112. However, if the guest 110 does not respond or does not grant permission, access to the structure 116 may be denied.

Upon determining the location data 406, the service provider 102 may perform a guest device proximity verification 408. That is, the service provider 102 may determine whether the guest device 112 is within a predetermined or threshold distance from the structure 116 and/or the structure entrance 118 that would be used to access the structure 116. Based on an address of the structure 116 or location data provided by the smart lock 120 associated with the structure entrance 118, the service provider 102 may determine a known location of the structure 116/structure entrance 118. Such information may also be provided by the owner 106 associated with the structure 116. Via the guest device proximity verification 408, the service provider 102 may determine whether the current location of the guest device 112 is within a predetermined/threshold distance (e.g., 5 feet, 20 feet, etc.) from the known location of the structure 116/structure entrance 118. Instead of, or in addition to, using GPS to determine the current location of the guest device 112, the service provider 102 may determine the proximity of the guest device 112 to the structure 116/ structure entrance 118 based on the guest device 112 connecting to a Wi-Fi network associated with the structure 116 or the lock 120. In other embodiments, the proximity of the guest device 112 to the structure 116/structure entrance 118 may be determined based on the guest device 112 connecting to the lock 120 or a different device associated with the structure 116 via a Bluetooth connection.

As described above, the guest device proximity verification 408 may be performed based on the current location of the guest device 110. However, the service provider 102 may perform the guest device proximity verification 408 without receiving or obtaining location data (e.g., GPS data) associated with the guest device 112. In particular, the service provider 102 may request that the guest 110 provide information that can be used to verify that the guest 110 is currently located at the structure 116 and/or structure entrance 118. For instance, the service provider 102 may request, or the guest 110 may provide, information regarding a shape, color, design, type, etc., of the structure entrance 118 (e.g., "what color is the door?", "how many windows does the door have?", etc.), the number of windows in proximity to the structure entrance 118, or any other information that indicates that the guest 110 is currently located at or near the structure entrance 118. The question may be presented, and/or the information may be provided, via one or more text messages or via the web site associated with the unique URL/link that was previously provided to the guest 110.

Upon determining that the current location of the guest device 112 is within a predetermined/threshold distance from the geographic location of the structure 116/structure entrance 118, the service provider 102 may determine that the guest device proximity verification 408 has been satisfied. As a result, the service provider 102 may authenticate the guest 110 by confirming the identity of the guest 110 based on the access code 138 and by confirming that the guest 110 is located at the structure 116 based on the current location of the guest device 112. Similar to the process illustrated in FIG. 3, the service provider 102 may perform an access schedule verification 410 to confirm that the guest 110 is authorized to access the structure 116 at that time, such as at the time the web-based access request 402 is submitted by the guest 110 and received by the service provider 102. The access schedule verification 410 may be based on the access schedule 136 included within the guest profile 130 of the guest 110. If the access schedule 136 of the guest 110 indicates that the guest 110 is not authorized by the owner 106 to access the structure 116 at that time, the guest 110 will receive, via the website, a notification indicating that access to the structure 116 has been denied.

Provided that the guest 110 is authorized to access the structure 116 at the time the web-based access request 402 is submitted, in order to determine which action the guest 110 desires to take, the service provider 102 may send, to the guest device 112, a web-based access inquiry 412. That is, via the website, the service provider 102 may present a first selectable option to unlock the structure entrance 118 (e.g., access the structure 116) and a second selectable option to lock the structure entrance 118 (e.g., secure the structure 116). For instance, the website may present a "lock" button and an "unlock" button. The guest 110 may then have the option of selecting whether he/she would like to lock or unlock the structure entrance 118 of the structure 116. The guest 110 selecting an option to lock or unlock the structure entrance 118 via the website may be referred to herein as a web-based access response 414.

After presenting the web-based access inquiry 412 to the guest device 112 via the web site, the service provider 102 may determine if the guest 110 responds within a threshold amount of time (e.g., 10 seconds, 1 minute, 5 minutes, etc.). If the guest 110 does not select one of the selectable options to lock/unlock the structure entrance 118 within that specified or predetermined amount of time, access to the structure 116 may be denied and the guest 110 may have to repeat the process set forth above in order to access the structure 116. The service provider 102 may present, via the website, a notification indicating that the web-based access request 402 timed out and that the guest 110 will need to again request access to the structure 116 in order to gain access.

Provided that the web-based access response 414 is received from the guest device 112 via the web site within the threshold amount of time, the service provider 102 may determine that the guest 110 would like to access or secure the structure 116 and cause the structure entrance 118 to be unlocked or locked, respectively. In order to cause the structure entrance 118 to be unlocked/locked, the service provider 102/content server(s) 104 may send one or more instructions to the smart lock 120 associated with the structure entrance 118 (i.e., send access instructions to lock 416). The access instructions 148 may be sent to hardware and/or software components of the smart lock 120 using any type of communication protocol/network (e.g., Zigbee, Bluetooth, etc.). In some embodiments, the access instructions 148 may include one or more digital keys that cause the smart lock 120 to lock/unlock. The access instructions 148 may cause the smart lock 120 to lock/unlock the structure entrance 118, thereby allowing the guest 110 to access the structure 116 via the structure entrance 118 or secure the structure entrance 118. As a result, the guest 110 may access/secure the structure 116 via a website associated with the service provider 102, and without having to download an application to a mobile telephone/electronic device.

As described in additional detail with respect to FIG. 3, the service provider 102 may send, to the owner device 108, one or more access notifications 418 indicating that an individual has accessed, or attempted to access, the structure 116. The owner 106 may also elect to modify or revoke access by a guest 110 to the structure 116 at his/her discretion.

For the purposes of this discussion, although the guest device 112 may send and receive information via text messages, a display, a website, etc., information may be input and output via the guest device 112 in an audible manner. For instance, one or more microphones of the guest device 112 may capture one or more voice commands audibly uttered by a guest 110 associated with the guest device 112. The audible commands may correspond to an access request 140, inputting an access code 138, specifying a current location of the guest device 112, indicating a request to unlock or lock a structure entrance 118, and so on. The audible commands may be referred to as audio data. The microphone(s) of the guest device 112 may generate one or more audio signals that represent the audio data. The guest device 112, the service provider 102, and/or the content server(s) 104 may process/analyze the audio signal(s) using one or more automated speech recognition (ASR) and/or natural language processing (NLP) techniques to determine one or more words audibly uttered by the guest 110, and perform operations in response thereto. In addition, information provided by the service provider 102/content server(s) 104 to the guest device 112 (e.g., an option for the guest 110 to lock/unlock the structure entrance 118) may be audibly output by one or more speakers of the guest device 112.

The process illustrated in FIG. 4 and described herein improves the functioning of a mobile device of a user that is attempting to access/secure a house/building that contains a smart lock. For instance, since the smart lock 120 may be locked/unlocked using a web-based process where the service provider 102 and a user interact via a website, a mobile application is not needed. As a result, users need not download a mobile application to his/her mobile device, and the mobile device need not store such a mobile application. Since a mobile application dedicated to the smart lock 120 does not need to be stored on the mobile device, memory on the mobile device can be preserved and can be used to store other data, applications, etc., that are used to perform operations by the mobile device. Increased memory availability may also allow the mobile device to function more efficiently, and may reduce the load experienced by processors 122 of the mobile device.

The processes illustrated in FIGS. 3 and 4 and described herein also reduce the risk/likelihood of unauthorized access of the structure 116 using electronic devices. The multi-step authentication protocol described with respect to FIG. 3 (e.g., telephone number verification 304, access code verification 306, access schedule verification 308, etc.) reduces the likelihood that an unauthorized individual/entity would be able to access the structure 116. For instance, in order for an unauthorized individual/entity to access the structure 116 in a malicious manner, the individual/entity would have to know the address of the structure 116, know the access schedule 136 of a particular guest 110 (e.g., times/days in which the guest 110 is authorized to access the structure 116), know the unique access code 138 of the guest 110, and spoof the telephone number 134 of the guest 110. Similarly, the multi-step authentication protocol described with respect to FIG. 4 (e.g., access code verification 404, guest device proximity verification 408, access schedule verification 410, etc.) also reduces the likelihood that an unauthorized individual/entity would be able to access the structure 116. For instance, in order for an unauthorized individual/entity to access the structure 116 in a malicious manner, the individual/entity would have to know the address of the structure 116, know the access schedule 136 of a particular guest 110 (e.g., times/days in which the guest 110 is authorized to access the structure 116), know the unique access code 138 of the guest 110, and either steal the guest device 112 of the guest 110 or spoof the current location of the guest device 112.

Figure 5:
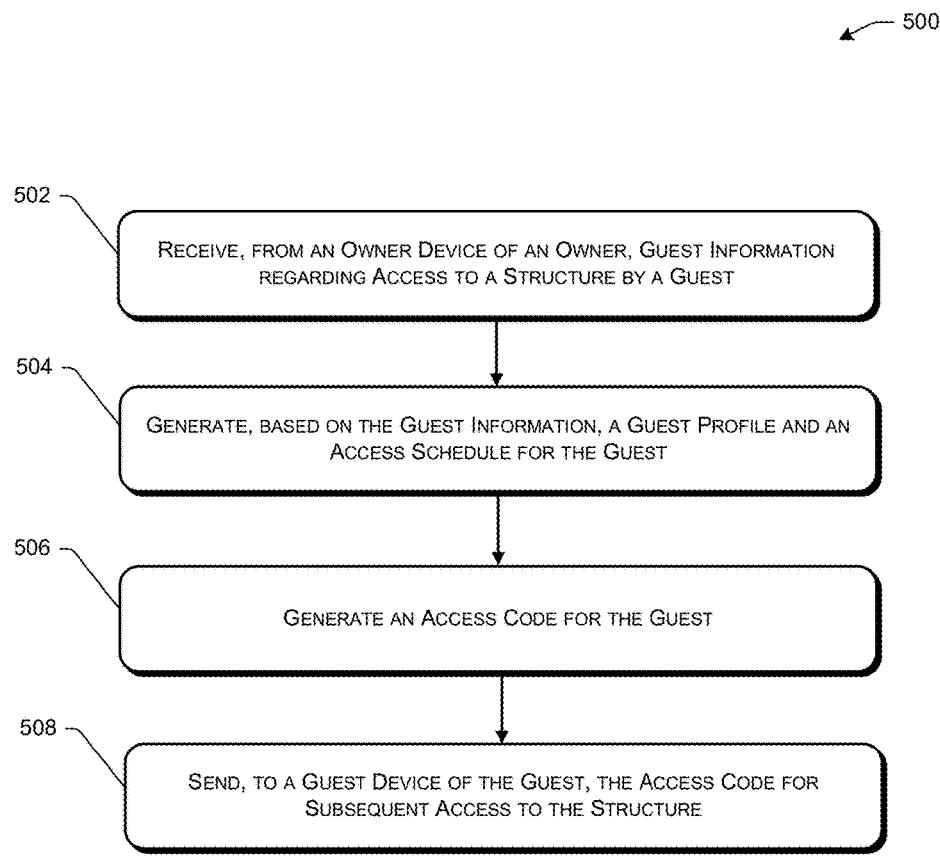
FIG. 5 is a flow diagram illustrating an example process of generating a guest profile and an access code to be used to facilitate accessing or securing a structure by an authorized user.
Figure 6:
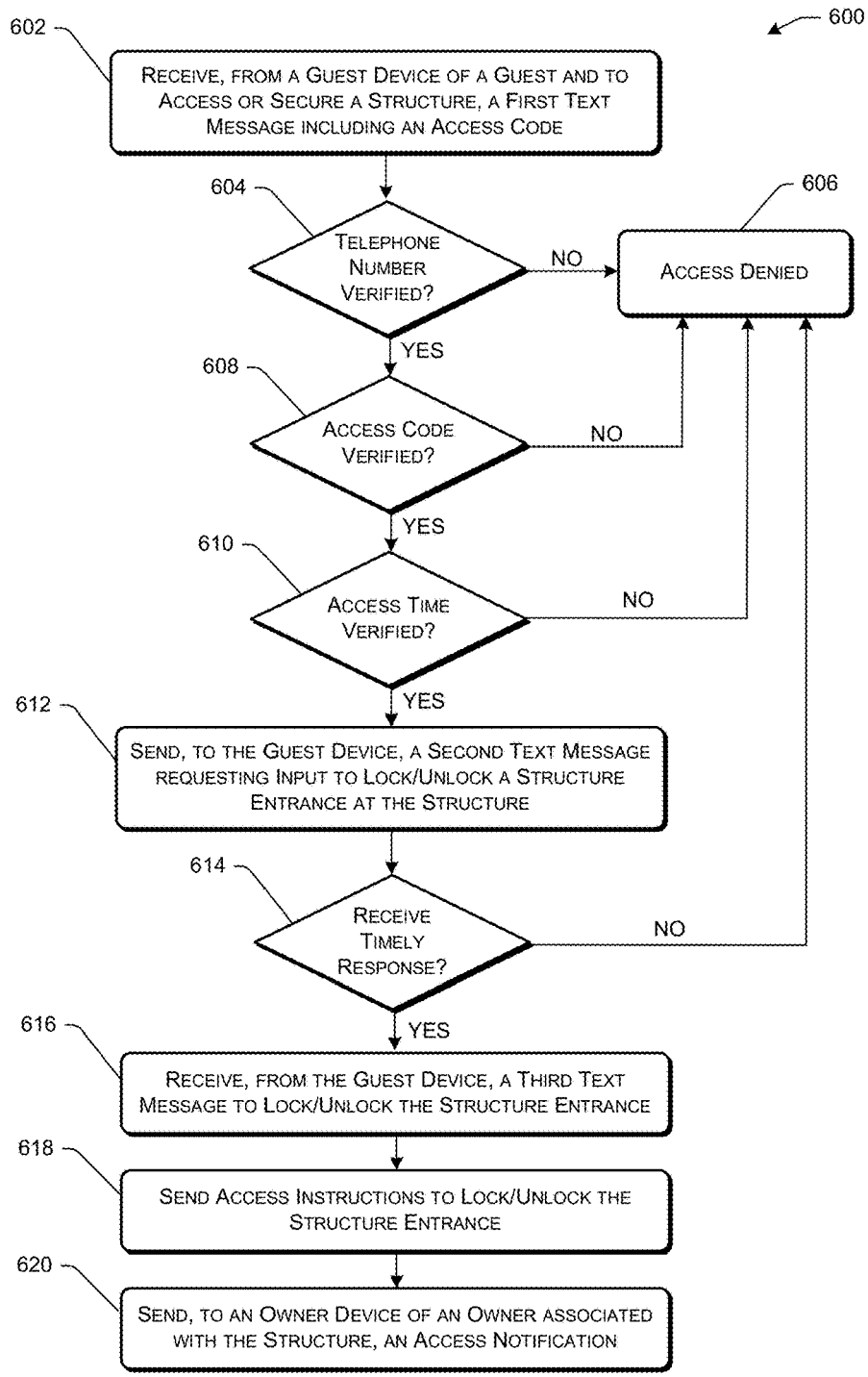
FIG. 6 is a flow diagram illustrating an example process of facilitating accessing or securing a structure by an authorized user using a text-based protocol.
Figure 7:
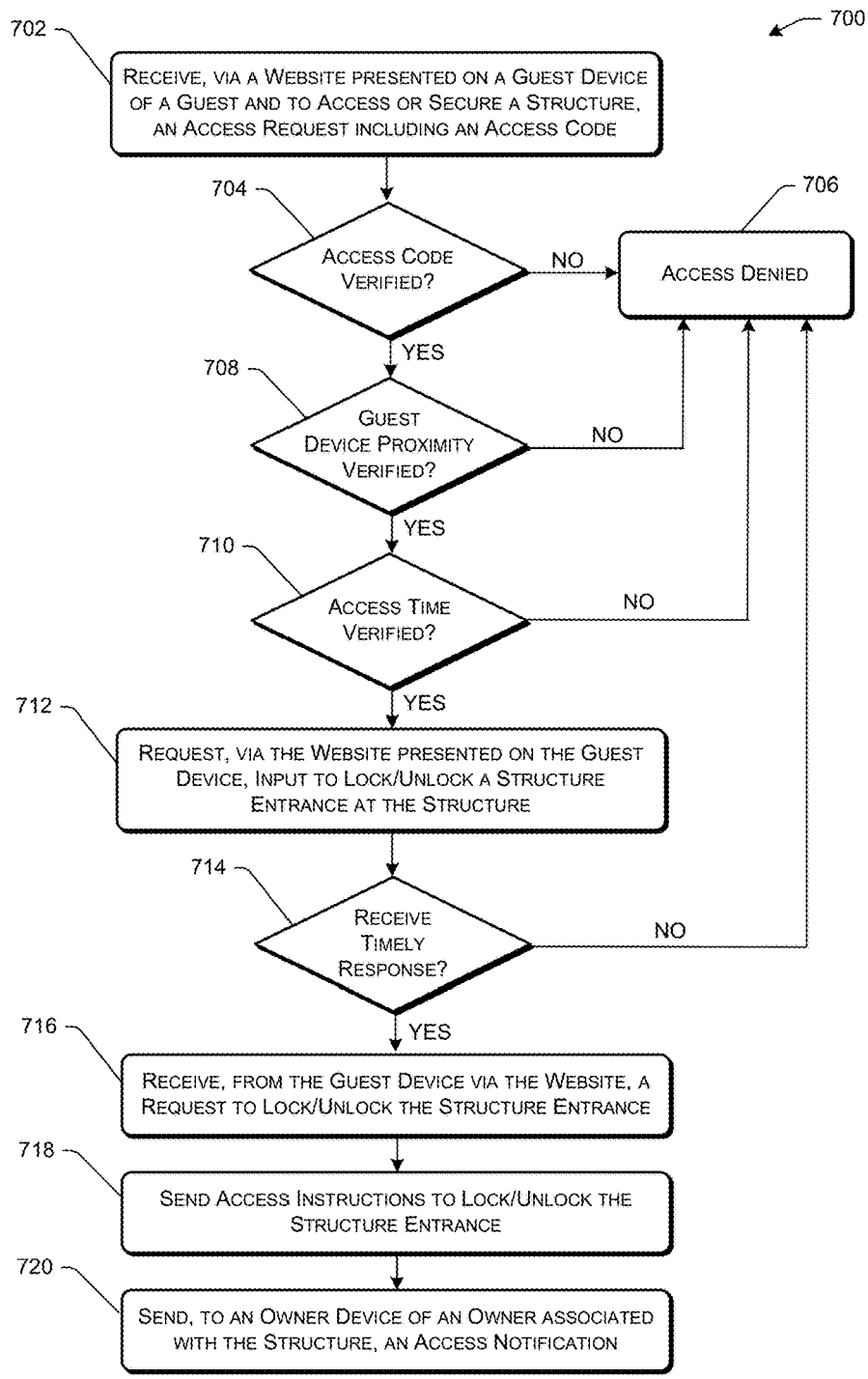
FIG. 7 is a flow diagram illustrating an example process of facilitating accessing or securing a structure by an authorized user using a web-based protocol.

FIGS. 5-7 illustrate example processes for facilitating the locking/unlocking of a structure based on at least one authentication protocol. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates a flow diagram of an example process 500 of generating a guest profile and an access code to be used to lock/unlock a smart lock. Moreover, the following actions described with respect to FIG. 5 may be performed by the service provider 102 and/or the content server(s) 104, as illustrated with respect to FIGS. 1-4.

Block 502 illustrates receiving, from an owner device of an owner, guest information regarding access to a structure by a guest. An owner 106 or primary user associated with a structure 116 (e.g., a house, a workplace, a building, etc.) may authorize one or more guests 110 or secondary users to access the structure 116 when the owner 106/primary user is not present. To do so, the owner 106/primary user may send guest information 128 to the service provider 102, where the guest information 128 may include an identity of the guest 110 (e.g., guest ID 132), a telephone number 134 of the guest 110, and an extent to which the guest 110 is authorized to access the structure 116. This may include times and/or days of the week that the guest 110 is authorized to access the structure 116, as well as a duration of time in which the guest 110 is authorized to have access (e.g., 1 week, 1 month, indefinite, etc.).

Block 504 illustrates generating, based on the guest information, a guest profile and an access schedule for the guest. Upon receiving the guest information 128, the service provider 102 may generate a guest profile 130 for the guest 110, which may be maintained by the content server(s) 104 and which may be subsequently used to verify/authenticate the guest 110 in response to receiving an access request 140 from a guest device 112 of the guest 110. The access schedule 136 may be generated by the owner 106 and/or the service provider 102 and may be subsequently used to determine if the guest 110 is authorized to access the structure 116 at a time at which the access request 140 is received from the guest 110.

Block 506 illustrates generating an access code for the guest. The service provider 102 may also generate a unique access code 138 for the guest 110 and maintain the access code 138 in the guest profile 130. The access code 138 may correspond to a unique dedicated short code that may be provided by the guest 110 when the guest 110 requests to access or secure the structure 116.

Block 508 illustrates sending, to a guest device of the guest, the access code for subsequent access to the structure. Upon generating the access code 138, the service provider 102 may send the access code 138 via a text message to the guest device 112 of the guest 110. Alternatively, or in addition, the service provider 102 may send the access code 138 associated with the guest 110 to the owner 106 (via a text message, an e-mail message, a mobile application, a website, etc.). The owner 106 may then send the access code 138 to the guest 110 (via a text message, an e-mail message, etc.). The guest 110 may maintain the access code 138 for subsequent use.

In certain embodiments, although the access code 138 may be generated by the service provider 102/content server(s) 104, the access code 138 may be modifiable by the owner 106 and/or the guest 110. For instance, after the service provider 102 sends the access code 138 to the owner 106, the owner 106 may modify the access code 138 (e.g., from "abc123" to "robert") and then send the modified access code 138 to the guest 110. The owner 106 may also send the modified access code 138 to the service provider 102 so that the service provider 102 may update the guest profile 130 of the guest 110 to reflect the modified access code 138. Provided that the guest 110 modified the access code 138, the guest 110 may inform the service provider 102 and/or the owner 106 of the modified access code 138. In this scenario, the service provider 102 and/or the owner 106 may have to approve the modification of the access code 138 by the guest 110.

FIG. 6 illustrates a flow diagram of an example process 600 of facilitating the locking/unlocking of a structure based on a text-based authentication protocol. Moreover, the following actions described with respect to FIG. 6 may be performed by the service provider 102 and/or the content server(s) 104, as illustrated with respect to FIGS. 1-4.

Block 602 illustrates receiving, from a guest device of a guest and to access or secure a structure, a first text message including an access code. In order to access or secure a structure 116 (e.g., a house, a building, etc.) by causing a structure entrance 118 (e.g., a door) to be unlocked or locked, the guest 110 may submit a text-based access request 302. The text-based access request 302 may be a text message sent from the guest device 112 to a dedicated short code associated with the service provider 102, and may include an access code 138 that was previously provided to guest 110 by the service provider 102.

In block 604, it is determined whether a telephone number 134 used to send the text message is verified, which may correspond to the telephone number verification 304 illustrated in FIG. 3. That is, the service provider 102 may determine whether the telephone number 134 used to send the text message (i.e., the text-based access request 302) matches the telephone number 134 included in the guest profile 130 of the guest 110. If the telephone numbers 134 do not match (the "no" from block 604), access to the structure 116 will be denied in block 606, and the guest device 112 may receive a text message indicating that access to the structure 116 has been denied.

In block 608, if the telephone number 134 used to send the text message is verified in block 604 (the "yes" from block 604), it is determined whether the access code 138 included in the text message is verified. This may correspond to the access code verification 306 illustrated in FIG. 3. More particularly, the service provider 102 may determine whether the access code 138 included in the text message matches the access code 138 that is included in the guest profile 130 of the guest 110 and that was previously provided to the guest device 112 by the service provider 102. If the access codes 138 do not match (the "no" from block 608), access to the structure 116 will be denied in block 606, and the guest device 112 may receive a text message indicating that access to the structure 116 has been denied.

In block 610, if the access code 138 included in the text message is verified in block 608 (the "yes" from block 608), it is determined whether the guest 110 is authorized to access the structure 116 at that time. This may correspond to the access schedule verification 308 illustrated in FIG. 3. In some embodiments, the service provider 102 may refer to the access schedule 136 of the guest 110 to determine times/days in which the guest 110 is authorized to access the structure 116. If the access schedule 136 indicates that the guest 110 is not authorized to access the structure 116 at the time at which the guest 110 submitted the text-based access request 302 (the "no" from block 610), access to the structure 116 will be denied in block 606, and the guest device 112 may receive a text message indicating that access to the structure 116 has been denied.

However, if the guest 110 is authorized to access the structure 116 at that time (the "yes" from block 610), block 612 illustrates sending, to the guest device, a second text message requesting input to lock/unlock a structure entrance at the structure (i.e., the text-based access inquiry 310). For instance, the service provider 102 may send a text message requesting whether the guest 110 would like to lock or unlock the structure entrance 118 (e.g., text "1" to unlock, text "2" to lock"). In block 614, the service provider 102 may determine whether the guest 110 provides a timely response to the second text message. For instance, the service provider 102 may determine whether the guest 110 sends a reply text message within a predetermined/threshold amount of time (e.g., 30 seconds, 1 minute, 5 minutes, etc.). If not (the "no" from block 614), access to the structure 116 will be denied in block 606, and the guest device 112 may receive a text message indicating that access to the structure 116 has been denied and/or that the text-based access request 302 has timed out. In certain embodiments, the determination of whether the reply text message is received within a timely manner may only apply to instances in which the guest 110 is requesting that the structure entrance 118 be unlocked (e.g., access to the structure 116).

If the guest 110 responds to the second message in a timely manner (the "yes" from block 614), block 616 illustrates receiving, from the guest device, a third text message to lock/unlock the structure entrance. The third text message may correspond to the text-based access response 312 illustrated in FIG. 3. The third text message may indicate that the guest 110 would like to lock or unlock the structure entrance 118, such as by the third text messaging including a "1" or a "2."

Block 618 illustrates sending access instructions to lock/unlock the structure entrance. In various embodiments, in response to receiving the third text message, the service provider 102 may send access instructions 148 to the lock 120 associated with the structure entrance 118. The access instructions 148 may cause the lock 120 to lock or unlock the structure entrance 118, thereby allowing the guest 110 to access or secure the structure 116.

Block 620 illustrates sending, to an owner device of an owner associated with the structure, an access notification. In some embodiments, the service provider 102 may inform the owner 106 when a guest 110 accesses or attempts to access the structure 116, as well as instances in which an unauthorized individual/entity accesses or attempts to access the structure 116.

FIG. 7 illustrates a flow diagram of an example process 700 of facilitating the locking/unlocking of a structure based on a web-based authentication protocol. Moreover, the following actions described with respect to FIG. 7 may be performed by the service provider 102 and/or the content server(s) 104, as illustrated with respect to FIGS. 1-4.

Block 702 illustrates receiving, via a website presented on a guest device of a guest and to access or secure a structure, an access request including an access code. In order to access or secure a structure 116 (e.g., a house, a building, etc.) by causing a structure entrance 118 (e.g., a door) to be unlocked or locked, the guest 110 may submit a web-based access request 402. The web-based access request 402 may be submitted via a website associated with a link/URL previously provided to the guest device 112 by the service provider 102. The access code 138 of the guest 110, as well as the link/URL, may have been previously provided to the guest device 112 via a text message. To submit the web-based access request 402, the guest 110 may select the link/URL via his/her guest device 112 and input the access code 138 via the web site.

In block 704, it is determined whether the access code 138 included in the web-based access request 402. This may correspond to the access code verification 404 illustrated in FIG. 4. More particularly, the service provider 102 may determine whether the access code 138 submitted via the website matches the access code 138 that is included in the guest profile 130 of the guest 110 and that was previously provided to the guest device 112 by the service provider 102. If the access codes 138 do not match (the "no" from block 704), access to the structure 116 will be denied in block 706, and the guest device 112 may receive an indication via the website that access to the structure 116 has been denied.

In block 708, if the access code 138 included in the web-based access request 402 is verified (the "yes" from block 704), it is determined whether the proximity of the guest device is verified, which may correspond to the guest device proximity verification 408 illustrated in FIG. 4. In particular, the service provider 102 may determine whether the current geographic location of the guest device 112 is within a predetermined or threshold distance (e.g., 5 feet, 10 feet, etc.) from a known geographic location of the structure 116 or the structure entrance 118 that includes the smart lock 120. If the distance between the current location of the guest device 112 and the known location of the structure 116/structure entrance 118 is greater than the predetermined or threshold distance (the "no" from block 708), access to the structure 116 will be denied in block 706, and the guest device 112 may receive an indication via the web site that access to the structure 116 has been denied.

In block 710, if the guest device 112 is determined to be within the predetermined/threshold distance from the structure 116/structure entrance 118 (the "yes" from block 708), and the guest device 112 is determined to be in proximity to the structure 116, it is determined whether the guest 110 is authorized to access the structure 116 at that time. This may correspond to the access schedule verification 410 illustrated in FIG. 4. In some embodiments, the service provider 102 may refer to the access schedule 136 of the guest 110 to determine times/days in which the guest 110 is authorized to access the structure 116. If the access schedule 136 indicates that the guest 110 is not authorized to access the structure 116 at the time at which the guest 110 submitted the web-based access request 402 (the "no" from block 710), access to the structure 116 will be denied in block 706, and the guest device 112 may receive an indication via the website that access to the structure 116 has been denied.

However, if the guest 110 is authorized to access the structure 116 at that time (the "yes" from block 710), block 712 illustrates requesting, via the website presented on the guest device, input to lock/unlock a structure entrance at the structure (i.e., the web-based access inquiry 412). For instance, the service provider 102 may present selectable options/buttons via the website that allow the guest 110 to indicate a preference to lock or unlock the structure entrance 118 (e.g., a "lock" button and an "unlock button"). In block 714, the service provider 102 may determine whether the guest 110 timely responds to the web-based access inquiry 412 by selecting the "lock" option or the "unlock" option within a predetermined/threshold amount of time (e.g., 30 seconds, 1 minute, 5 minutes, etc.). If not (the "no" from block 714), access to the structure 116 will be denied in block 706, and the guest device 112 may receive an indication via the website that access to the structure 116 has been denied and/or that the web-based access request 402 has timed out.

If the guest 110 responds to the web-based access inquiry 412 in a timely manner (the "yes" from block 714), block 716 illustrates receiving, from the guest device via the website, a request to lock/unlock the structure entrance. The guest 110 selecting the "lock" option or the "unlock" option via the website may correspond to the web-based access response 414 illustrated in FIG. 4. Such a selection may indicate that the guest 110 would like to lock or unlock the structure entrance 118.

Block 718 illustrates sending access instructions to lock/unlock the structure entrance. In various embodiments, in response to receiving the web-based access response 414 via the website, the service provider 102 may send access instructions 148 to the lock 120 associated with the structure entrance 118. The access instructions 148 may cause the lock 120 to lock or unlock the structure entrance 118, thereby allowing the guest 110 to access or secure the structure 116.

Block 720 illustrates sending, to an owner device of an owner associated with the structure, an access notification. In some embodiments, the service provider 102 may inform the owner 106 when a guest 110 accesses or attempts to access the structure 116, as well as instances in which an unauthorized individual/entity accesses or attempts to access the structure 116.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   memory;
   one or more processors; and
   one or more computer-executable instructions that are stored in the memory and that are executable by the one or more processors to perform operations comprising:
   identifying a residence associated with a first user, the residence including a door that is used to access the residence and that includes a smart lock;
   receiving, from a first user device of the first user, user information associated with a second user that has been authorized by the first user to access the residence via the door, the user information including a telephone number of a second user device of the second user and access information indicating an extent to which the second user is authorized to access the residence;

generating a user profile for the second user that is to be maintained in the memory, the user profile identifying the telephone number of the second user device, an access schedule that specifies at least one of times or days in which the second user is authorized to access the residence, and a unique short code associated with the second user;

sending, from a dedicated short code associated with a service provider and to the telephone number of the second user device, a text message that includes the unique short code and a unique URL associated with a website;

receiving, at a time and via the website displayed on a display of the second user device, a request to at least one of access or secure the residence via the door, the request including the unique short code;

verifying that the second user is authorized to at least one of access or secure the residence via the door by:
  determining that the request includes the unique short code previously provided to the second user;
  determining that the time corresponds to the at least one of the times or the days in which the second user is authorized to access the residence;
  receiving, from the second user device, GPS data that indicates a current geographic location of the second user device at the time; and
  determining that the current geographic location of the second user device is within a threshold distance from a known geographic location of at least one of the residence, the door, or the smart lock;

causing, via the website displayed on the display of the second user device and based on a determination that the second user is authorized to at least one of access or secure the residence at the time, presentation of a first selectable option to unlock the door and a second selectable option to lock the door;

receiving, via the website displayed on the display of the second user device, a selection of the first selectable option or the second selectable option; and sending, to at least one of one or more components of the smart lock or one or more devices that are communicatively coupled to the smart lock, and based on the selection of the first selectable option or the second selectable option, an access instruction to cause the smart lock to unlock or lock the door.

2. The system as recited in claim 1, wherein the operations further comprise sending, to the first user device of the first user, a notification indicating that the door has been unlocked or locked.

3. The system as recited in claim 1, wherein verifying that the second user is authorized to at least one of access or secure the residence via the door further comprises:
  searching a plurality of user profiles each associated with a different user to identify the user profile; and
  identifying the unique short code, the access schedule, and the known geographic location from the user profile.

4. The system as recited in claim 1, wherein the operations further comprise:
  determining that the first selectable option and the second selectable option were presented at a second time;
  determining that the selection was received at a third time that is subsequent to the second time;
  determining that an amount of time from the second time to the third time is less than or equal to a threshold amount of time; and
  sending the access instruction based on a determination that the amount of time is less than or equal to the threshold amount of time.

5. The system as recited in claim 1, wherein the access instruction causes the smart lock to unlock the door, and wherein the operations further comprise:
  determining a second time at which the door was unlocked;
  determining that the door has not been relocked within a threshold amount of time after the second time; and
  sending, to the one or more components of the smart lock, a second access instruction to cause the smart lock to lock the door.

6. A method comprising:
  determining that a first user has authorized a second user to access a structure via a structure entrance having a lock;
  sending, at a first time, a link or a URL and an access code to the second user;
  receiving, at a second time that is after the first time and via a website associated with the link or the URL, an access request that includes the access code;
  determining that the access code is associated with the second user;
  determining a current location of a user device associated with the second user;
  determining, based at least partly on the access code and the current location of the user device, that the second user is authorized to at least one of access or secure the structure at the second time; and
  sending an access instruction to cause the structure entrance to be locked or unlocked.

7. The method as recited in claim 6, further comprising:
  receiving, from a first user device of the first user, user information associated with the second user, the user information including a telephone number of the second user and access information indicating an extent to which the second user is authorized to access the structure; and
  generating a user profile for the second user, the user profile identifying the telephone number of the second user, an access schedule that specifies at least one of times or days in which the second user is authorized to access the structure, and the access code.

8. The method as recited in claim 7, further comprising:
  at least partly in response to receiving the user information, generating the access code; and
  sending, from a dedicated short code associated with a service provider and to the telephone number of the second user, a text message that includes the access code.

9. The method as recited in claim 6, further comprising:
  determining a known geographic location of at least one of the structure, the structure entrance, or the lock;
  determining that the current location of the user device is within a threshold distance from the known geographic location; and
  sending the access instruction based at least partly on a determination that the current location of the user device is within the threshold distance from the known geographic location.

10. The method as recited in claim 6, further comprising:
  presenting, via the website displayed on the user device and based on a determination that the second user is authorized to at least one of access or secure the structure at the second time, a first selectable option to access the structure and a second selectable option to secure the structure;

receiving, via the website displayed on the user device, a selection of the first selectable option or the second selectable option; and sending, based at least partly on the selection of the first selectable option or the second selectable option, the access instruction.

11. The method as recited in claim 10, further comprising determining the current location of the user device based at least partly on GPS data associated with the user device, an application residing on the user device, or location data input by the second user via the user device.

12. The method as recited in claim 6, further comprising sending, to the first user, a notification associated with the structure, the notification indicating that at least one of the second user attempted to access the structure or the structure entrance was locked or unlocked.

13. The method as recited in claim 6, wherein the access code is a short code that includes at least one of one or more numbers, one or more letters, or one or more symbols.

14. A method comprising:

receiving, at a time and via a website displayed on a user device, an access request to access or secure a structure associated with a first user via a structure entrance having a lock;

verifying that a second user associated with the user device is authorized to access or secure the structure at the time based at least partly on an access code provided via the website and a determination that a current location of the user device is within a threshold distance from a known geographic location of the structure;

presenting, via the website displayed on the user device, a first selectable option to access the structure and a second selectable option to secure the structure;

receiving, via the website displayed on the user device, a selection of the first selectable option or the second selectable option; and sending, based at least partly on the selection of the first selectable option or the second selectable option, an access instruction to cause the lock to unlock or lock the structure entrance.

15. The method as recited in claim 14, wherein verifying that the second user is authorized to access or secure the structure comprises:

determining that the access code was previously provided to the second user; and determining that the time corresponds to at least one of times or days in which the first user authorized the second user to access the structure.

16. The method as recited in claim 14, further comprising sending, to a second user device of the first user, a notification indicating that the structure entrance has been unlocked or locked.

17. The method as recited in claim 14, further comprising:

receiving, from the first user, user information associated with the second user, the user information including a telephone number of the second user and access information indicating an extent to which the second user is authorized to access the structure; and generating, at least partly in response to receiving the user information, the access code.

18. The method as recited in claim 14, further comprising sending, to a telephone number of the second user, a text message that includes the access code and a link or URL that is associated with the website, and that indicates that the first user has authorized access to the structure by the second user.

19. The method as recited in claim 14, further comprising sending, to the user device, a link or URL that is associated with the website and the access code, and wherein the access request corresponds to the second user selecting the link or URL via the user device to cause presentation of the website and inputting the access code via the website.

20. The method as recited in claim 14, wherein the structure includes at least one of a residence, a workplace, a building, a vehicle, or a boat, and wherein the structure entrance includes at least one of a door or a window.

* * * * *